United States Patent [19]

Levin et al.

[11] 3,944,655
[45] Mar. 16, 1976

[54] PROCESS OF PREPARING FOOD PRODUCTS FROM BONES

[75] Inventors: Ezra Levin, Champaign; John Darwin Mosser, Monticello, both of Ill.

[73] Assignee: VioBin Corporation, Monticello, Ill.

[22] Filed: Sept. 10, 1973

[21] Appl. No.: 395,717

[52] U.S. Cl. .................. 426/32; 426/59; 426/429; 426/657
[51] Int. Cl.² ............................................. A23J 1/10
[58] Field of Search ....... 426/59, 56, 364, 212, 194, 426/417, 425, 429, 32

[56] References Cited
UNITED STATES PATENTS

| | | | |
|---|---|---|---|
| 3,674,657 | 7/1972 | Levin | 426/417 X |
| 3,692,538 | 9/1972 | Moss et al. | 426/59 |

*Primary Examiner*—A. Louis Monacell
*Assistant Examiner*—Esther L. Massung
*Attorney, Agent, or Firm*—Burmeister, York, Palmatier, Hamby and Jones

[57] ABSTRACT

A liquid protein food of mild and pleasant taste is made by digesting powdered defatted bones including the bone marrow with trypsin, amylase and lipase which may be used in their pure state or mixed with other material. A pancreatin product, preferably Viokase, which contains the trypsin, amylase and lipase of suitable activity gives highly satisfactory results.

The digestion results in a liquid containing the solubilized protein of the marrow, and a solid residue which is mainly collagen and calcium phosphate. A soluble collagenous product and a substantially pure mineral product is made from the residue by hydrolyzing it at a pH of 2–5. Pancreatin or other enzyme containing material effective in hydrolyzing collagen may be used.

The defatted bones which are preferred for use in the digestion process are made by mixing bones including their marrow in an organic liquid fat solvent, such as ethylene dichloride, which forms an azeotrope with water.

The mixture is heated at a moderate temperature such as 60°C and an azeotrope of solvent and water distills over. The fat is dissolved in the liquid solvent and is recovered by evaporation of the solvent. The fat obtained is suitable as a high grade soup stock and consists mainly of the fat from the bone marrow.

10 Claims, No Drawings

PROCESS OF PREPARING FOOD PRODUCTS FROM BONES

The invention relates to a process of preparing food products from bones and products obtained thereby.

The bones used in the process of this invention are those which contain marrow in their centers. The marrow contains a valuable edible fat and also contains hemaglobin and other protein. The bone itself consists of an organic basis of albuminous nature in which a great amount of inorganic matter is deposited. The organic substance is mainly collagen with a minor amount of osseomucoid and very small amount of osseoalbuminoid. The inorganic material makes up about 40 percent of the dry residue of the bone and is chiefly calcuim phosphate and calcium carbonate, but there is also present a little magnesium and a trace of fluoride and chloride.

Whole bones, marrow and all, are generally used to make gelatin, the inorganic material being discarded and the constituents of the bone marrow, including bone marrow protein, not being separated from the other material of the bone during the process of making gelatin.

The bone marrow contains a nutritious protein which, so far as I know, has never been separated either wholly or partially from the other protein of the bone, and which never has been prepared and made suitable for use as a food.

An object of this invention is to provide a process for separating the protein of bone marrow from the major portion of the protein of the bone itself.

Another object is to provide a liquid food product containing the solubilized protein of bone marrow.

A further object is to provide a fat from bones which has a pleasant flavor and aroma and is useful as a high grade soup stock.

Another object is to provide a soluble collagenous product and minerals from the bone residue remaining after removal of fat from bone and the solubilizing of the protein of the bone marrow.

In accordance with one embodiment of this invention defatted and dehydrated particles containing bone and bone marrow are digested in an aqueous mixture of trypsin, amylase and lipase in an amount of each of said enzymes of at least 0.001% of the dry bone marrow by weight at a temperature of 15° C. to 23° C. and a pH of about 7 to 9 and for a time sufficient to dissolve a substantial amount of the protein of the bone marrow in said particles while dissolving not more than a portion of the protein of the bone in said particles. The solution obtained by the digestion process is separated from the residue by known means, such as decanting, filtering or centrifuging. The solution may be used itself as a liquid protein food or a solid protein may be recovered from the solution, such as by low temperature evaporation, or the solution may be spray dried to obtain a water soluble protein powder. The solid residue may be used to make a soluble collagenous product and a mineral product suitable for use in a pet food.

It has been found that trypsin, amylase and lipase must all be used to obtain satisfactory results in the digestion process, but that other enzymes present in pancreatin may also be present. It is particularly desirable to use a pancreatin product which contains approximately all the enzymes present in raw pancreas.

The digestion is carried out at not more than slightly above room temperature such as, for example, 15°–23° C, preferably approximately 20° C. The time of digestion is not critical but should be sufficient to dissolve a substantial amount of the protein of the bone marrow, for example, a time of 2–8 hours. The digestion is carried out in an aqueous mixture at neutral or alkaline conditions, such as a pH of 7–9, preferably a pH of approximately 8.0.

The minimum amount of each of the three enzymes per unit weight of dry bone that must be used to suitably solubilize the protein of the marrow of the bone is very small, such as 0.001 percent of the dry bone marrow for each of the three enzymes in their active state. The amount is best determined by adding the enzymes to an aqueous mixture of the powdered bone and observing whether adequate solubilizing takes place in a reasonable period of time. For example, the weight of solid bone before and after contact with the enzymes is determined and if there is a substantial loss of weight in 3 hours time the amount of enzymes used is sufficient, otherwise more is required and is added.

It has been found that a suitable and efficient source of the enzymes trypsin, amylase and lipase is present in the pancreatin product sold by Viobin Corporation under the trademark Viokase. This Viokase has an activity of such enzymes in defatted pancreas tissue such that when it is mixed with powdered defatted bone and water only 0.1 percent of the Viokase on the basis of the dry bone is required. The amount of water appears to be unimportant so long as contact of the Viokase with the bone is maintained, but the total solids of bone and Viokase can be 5–10 percent by weight of the total mixture substantially affecting the solubilizing reaction.

Viokase is a dehydrated and defatted powdered pancreas made in accordance with U.S. Pat. No. 2,503,313, wherein the pancreas is defatted with a fat solvent such as ethylene dichloride or other fat solvent which forms an azeotrope with water and dehydrated by azeotropic distillation at moderate temperatures, such as below 60° C. See particularly Example 1 showing the production of a suitable pancreatin for use in the process of this invention. This U.S. Pat. No. 2,503,313 is hereby incorporated by reference.

Viokase or any other pancreatin have the following activity is particularly suitable for the practice of this invention.

a. The activity of trypsin of at least 4 times the activity of the U.S.P. pancreatin powder made by comminuting fresh animal pancreas in the presence of water and thereafter adding absolute alcohol to precipitate a composition containing enzymes. The United States Pharmacopae sets forth standards of activity for this pancreatin. The standards are described in the United States Formularly, 12th Edition, 1965, pp.287–288. An activity of trypsin sufficient to render at least twenty-five times its own weight of casein nonprecipitable by acid-alcohol after incubation for one hour at 40° C is desirable.

b. Amylase activity at least 4 times the activity of the U.S.P. standard for the precipitated type pancreatin, and able to hydrolyze at least 25 times its own weight of potato starch past the erythrodextrin stage in five minutes at 40° C.

C. A lipolytic activity at least 4 times that of the U.S.P. pancreatin and for at least 2000 units per gram as determined by the method described by Desnuelle et al, Bull. Soc. Chi. Biol., Vol. 37, p.285, 1955.

A suitable amount of the dehydrated and defatted pancreas made by the process of Example 1 of U.S. Pat. No. 2,503,313 and having the activity set forth in said patent is 0.1 percent of the dry powdered marrow containing bone.

The following is also an example of a pancreatin which is suitable as a digesting agent in the process of this invention.

EXAMPLE 1

Production of Pancreatic Enzyme Material

A pancreas from a freshly killed pig is minced and autolyzed for twenty-four hours at 30° C the minced mixture is then mixed with approximately 10 times its volume of ethylene dichloride at a temperature of 40° C, and a pressure of about 215 mm of mercury is maintained. An azeotrope of solvent and water is distilled continuously until about 98 percent of the water of the pancreas is removed. The temperature is controlled so that it does not exceed about 50° C. Following the desired dehydration, the solvent is decanted or drained and fresh solvent is added to the dry residue. The mixture is stirred and finally the solvent is withdrawn as far as drainage will permit. The pressure is reduced to about 50–100 mm and temperature is still maintained not in excess of about 50° C. These conditions are maintained until all of the ethylene dichloride is removed from the dry glands. The dried defatted granular residue is then separated and ground through a uniform mesh. The amylase activity of this material is found to be about 10-15 times that of the U.S.P. standard, and the proteolytic activity is also found to be about 4 times the U.S.P. standard. The lipase activity, according to the method previously described, is found to exceed 3000 units per gram.

Instead of using the dried defatted pancreas containing the enzymes, the enzymes of trypsin, amylase and lipase may be extracted with solvents by known procedures and the extracts used in the digestion process. The pure isolated enzymes may also be used but this greatly increases the expense and it has been found that the pancreatin containing the three exzymes apparently has other ingredients which aid in obtaining the solubilized proteins which are edible and have a mild and pleasant taste.

The powdered defatted bone which is digested is preferably made by mixing water and fat containing bones including their marrow in an organic fat solvent which forms an azeotrope with water which boils at a low temperature such as 60° C or below. Suitable solvents are the chlorinated hydrocarbons and other solvent disclosed in U.S. Pat. Nos. 2,503,313 and 2,619,425. The bones are treated the same way as the pancreas is treated in these patents. There is formed a defatted and dehydrated powdered bone which is particularly useful in the digestion process. There is also formed a solution of the fat in the solvent. On evaporation of the solvent at a moderate temperature of, for example, 80° C, there is obtained an edible fat which is a high grade soup stock. Because of the removal of water from the bone during the azeotropic distillation and the low temperature of distillation, preferably below 80° C, the fat is readily removed from the bone marrow with little or no decomposition. Hence it has superior flavor and odor characteristics. Furthermore the defatted bone by this process is so fat free and in such condition that it is particularly adaptable for the enzyme digestion process.

The following example illustrates a process for producing edible fat from bones containing marrow.

EXAMPLE 2

Production Of Edible Fat

Bones which contain bone marrow were cleaned from extraneous meat and fat, and the clean bones with their marrow were pulverized to a powder. The powdered bones were mixed in a distillation vessel with approximately 10 times their volume of ethylene dichloride. At a temperature of 40° C and a pressure of approximately 215 mm of mercury, an azeotrope of ethylene dichloride and water was distilled and this distillation was continued until about 98 percent of the water contained in the bone was removed. At no time was the temperature allowed to exceed approximately 50° C. When the bones had been dehydrated to the desired point, the solvent was drained out through a screened opening in the vessel and fresh solvent was added to the residue. The mixture was stirred and finally the solvent was withdrawn to the full extent that it would drain out. The pressure within the vessel was then reduced to about 50–100 mm and the vessel warmed, but preferably not to above 80° C, until all the ethylene dichloride had been removed from the dehydrated bones. The dehydrated bones, which contained the nonfat constituents of the bone marrow, including the protein, were used to produce solubilized protein food in accordance with the digestion process of this invention. The solvent contained the fat from the bone, principally from the bone marrow. The solvent of this fat solution was evaporated at below about 80° C, viz. 60° C, leaving a residual fat.

The azeotropic distillation at low temperature to remove water makes the removal of fat from the bones by extraction much more efficient. The removal of the fat can be done in less time and to a greater degree. The fat is a high grade soup stock. The dry defatted bones are in better condition for digestion with enzymes than bones defatted without an azeotropic distillation of the water.

EXAMPLE 3

Solubilization Of Protein Of The Bone Marrow

Powdered defatted dry bone made in accordance with Example 2 was mixed in water and then the powdered defatted pancreas made in accordance with Example 1 was added. This pancreatin material had the trypsin, amylase and lipase activity as follows:

trypsin: approximately 1.00 hemaglobin units per gram of dried pancreatin;
amylase: an ability to hydrolize 25 times its own weight of potato starch past the erythrodextrin stage in 5 minutes at 40° C;
lipase: activity of 4000 units per gram as determined by the method of Desnuelle et al, supra.

The pancreatin material of the above activity was used in an amount of 0.15 grams per 100 grams of the bone on a dry basis. The powdered bone and pancreatin was present in the water in about 10 percent by weight. The water was made slightly alkaline with sodium hydroxide and the mixture maintained at a pH of approximately 8.0. The temperature of the mixture was maintained at approximately 20° C.

The bone and bone marrow were kept in contact with the pancreatin and its enzymes for 5 hours, the digestion of marrow protein and conversion of this protein to a soluble form being substantially complete in about 4 hours.

At the end of the 5 hours the aqueous solution of protein was separated from the bone residue. This solution was a mild and pleasant tasting liquid protein food suitable for animal and human consumption.

A breakdown of the materials used and obtained by the above process is given below:

Starting material - 2000 pounds of beef bone.

| Defatted and Dehydrated | | Fat | Water |
|---|---|---|---|
| 895 pounds | (44.7%) | 435 pounds (21.7%) | 670 pounds (33%) |
| Protein | 38.4% | crude, | ↓ |
| Ash | 58.5% | excellent quality | discarded |
| Moisture | 4.0% | | |
| Fat | trace | | |

| Enzymatic Digestion | | Product from First Digestion | |
|---|---|---|---|
| 165 pounds soluble edible marrow protein, good flavor | →  | 730 pounds of bone residue | |
| Protein | 85.2% | Protein | 27.9% |
| Ash | 10.6% | Ash | 69.0% |
| Moisture | 5.5% | Moisture | 2.8% |
| Fat | trace | Fat | trace |

It will be understood that the above examples are illustrative of the invention and that the proportions, temperature, time and other conditions may be varied within the skill of the art and in accordance with the general disclosure in this specification. For example, a pancreatin containing a lesser enzyme activity can be used by increasing the amount of pancreatin to bone. Also, of course, enzyme extracts or substantially pure enzyme can be used. Likewise, while defatted and dehydrated bone is preferred and gives better and quicker digestion, there can be used ordinary fat and water containing bone which has marrow with it.

EXAMPLE 4

Production of Soluble Collagenous Product and Mineral Products

The 730 pounds of bone residue of Example 3, which is mainly collagen and calcium phosphate, is processed to produce a soluble collagen protein and a valuable mineral residue. The bone residue of Example 3 is heated with pressure of about 15 pounds per square inch for a period of approximately 2½ hours for the purpose of breaking down the protein to facilitate a subsequent enzymatic digestion and to assure a sterilized raw material for the subsequent enzymatic digestion. Immediately following the step of heating the material under pressure, the material is cooled, the pH is adjusted to the range of 2 to 5, and digested with a pancreatic enzyme. The same pancreatic enzyme used to prepare the bone residue in Example 3 is used in an amount of 0.1 grams per 100 grams of material on a dry basis. After digestion, approximately 103 pounds of collagen solubles are decanted, leaving about 627 pounds of bone residue. The bone residue consists of approximately 60 percent calcium and 5 percent calcium carbonate.

The invention may now be practiced in the various ways which will occur to those who will consider this disclosure, and it should be understood that all such variations in the practice should be included with the scope of the invention so long as it comes within the terms of the following claims as given further meaning by the language of the preceding description.

The invention claimed is:

1. A process for making a liquid protein from the marrow of powdered bones which comprises dehydrating and extracting fat from said powdered bones to produce substantially fat free and moisture free particles including bone and bone marrow, contacting said particles in an aqueous mixture with the enzymes trypsin, amylase and lipase in an amount of each of said enzymes of at least 0.001 percent of the dry bone marrow by weight at a temperature of 15° C. to 23° C. and a pH of about 7 to 9 and for a time sufficient to enzymatically digest to solubilize a substantial amount of the protein of said bone marrow in said particles while solubilizing not more than a portion of the protein of the bone in said particles, and separating the protein solution from the residue.

2. A process in accordance with claim 1 in which the enzymes are present in a pancreatin powder.

3. A process in accordance with claim 2 in which the activity of the enzymes are:
   a. An activity of trypsin sufficient to render at least 25 times its own weight of casein nonprecipitable by acid-alcohol after incubation for one hour at 40° C;
   b. An activity of amylase sufficient to hydrolize at least 25 times its own weight of potato starch past the erythrodextrin stage in 5 minutes at 40° C;
   c. An activity of lipase at least 2000 units per gram as determined by the method described by Desnuelle et al in Bull. Soc. Chi. Biol., Vol. 37, p.285.

4. A process in accordance with claim 2 in which the pancreatin is obtained by mixing comminuted pancreas with a fat solvent which forms an azeotrope with water, carrying out an azeotropic distillation to remove water and removing fat by extraction with fat solvent, the pancreatin obtained by said process having a trypsin activity at least 4 times the activity of the U.S.P. standard for precipitated pancreatin described in the United States Formularly, 12th Edition, pp. 287–288, having an amylase activity at least 4 times that of said precipitated pancreatin and a lipase activity at least 4 times that of said precipitated pancreatin.

5. A process in accordance with claim 1 in which the steps of dehydrating and extracting fat from the powdered bone comprise comminuting bones containing marrow, mixing said bones with a fat solvent that forms an azeotrope with water, carrying out an azeotropic distillation at a temperature no greater than 80° C. to remove water and simultaneously remove fat by extraction.

6. A process of making a soup stock fat from bone marrow which comprises the process of claim 5, the fat of the bone being extracted into the fat solvent during said distillation, and recovering fat from the fat solvent by evaporation of the fat solvent at a temperature below about 80° C.

7. A process in accordance with claim 6 in which the fat solvent is ethylene dichloride.

8. A process of making a soluble collagenous product which comprises dehydrating and extracting fat from powdered bones to produce substantially fat free and moisture free particles containing bone and bone marrow, contacting said particles in an aqueous mixture with the enzymes trypsin, amylase and lipase in an amount of each of said enzymes of at least 0.001 percent of the dry bone marrow of said particles by weight at a temperature of 15° C. to 23° C. and a pH of about 7 to 9 and for a time sufficient to enzymatically digest to solubilize a substantial amount of the protein of the bone marrow of the particles while solubilizing not more than a portion of the protein of the bone contained in said particles, separating the protein solution from the residue, and enzymatically hydrolyzing the bone contained in the residue in an aqueous acid solution at a pH of 2–5.

9. A process in accordance with claim 8 wherein an enzyme effective in hydrolyzing collagen is used as a hydrolyzing agent.

10. A process in accordance with claim 8 wherein a pancreatin is used as a hydrolyzing agent.

* * * * *

PO-1050
(5/69)

UNITED STATES PATENT OFFICE
CERTIFICATE OF CORRECTION

Patent No. 3,944,655  Dated March 16, 1976

Inventor(s) Ezra Levin and Darwin Mosser

It is certified that error appears in the above-identified patent and that said Letters Patent are hereby corrected as shown below:

Column 2, line 35, after "mixture" insert --without--.

Signed and Sealed this

Tenth Day of August 1976

[SEAL]

Attest:

RUTH C. MASON
*Attesting Officer*

C. MARSHALL DANN
*Commissioner of Patents and Trademarks*